US011143259B2

(12) United States Patent
Dürre et al.

(10) Patent No.: US 11,143,259 B2
(45) Date of Patent: Oct. 12, 2021

(54) VIBRATION ABSORBER

(71) Applicant: Vibracoustic AG, Darmstadt (DE)

(72) Inventors: Markus Dürre, Neuenburg am Rhein (DE); Thomas Bock, Freiburg (DE); Frederik Goetz, Breisach (DE); Karsten Terhardt, Neuenburg (DE); Christian Paul, Auggen (DE)

(73) Assignee: Vibracoustic AG, Darmstadt (DE)

( * ) Notice: Subject to any disclaimer, the term of this patent is extended or adjusted under 35 U.S.C. 154(b) by 0 days.

(21) Appl. No.: 16/825,362

(22) Filed: Mar. 20, 2020

(65) Prior Publication Data
US 2020/0309226 A1 Oct. 1, 2020

(30) Foreign Application Priority Data

Mar. 27, 2019 (DE) .......................... 102019107885.7

(51) Int. Cl.
*F16F 7/108* (2006.01)
*F16F 1/373* (2006.01)

(52) U.S. Cl.
CPC ............ *F16F 7/108* (2013.01); *F16F 1/3732* (2013.01)

(58) Field of Classification Search
CPC .. F16F 7/10; F16F 7/108; F16F 1/3732; F16F 15/08; F16F 15/1442
See application file for complete search history.

(56) References Cited

U.S. PATENT DOCUMENTS

| | | | |
|---|---|---|---|
| 5,056,763 A * | 10/1991 | Hamada | F16F 15/1442 267/141 |
| 5,090,668 A * | 2/1992 | Hamada | F16F 15/1442 267/141 |
| 5,127,698 A | 7/1992 | Konig | |
| 5,884,902 A * | 3/1999 | Hamada | F16F 7/108 267/141 |
| 5,924,670 A | 7/1999 | Bailey et al. | |
| 6,065,742 A * | 5/2000 | Whiteford | F16F 7/108 188/378 |
| 6,682,060 B2 * | 1/2004 | Kato | F16F 15/1442 267/141 |

(Continued)

FOREIGN PATENT DOCUMENTS

| CN | 201526577 U | 7/2010 |
|---|---|---|
| CN | 202790281 U | 3/2013 |

(Continued)

OTHER PUBLICATIONS

Chinese Search Report, 2020101889723, dated Jun. 8, 2021.
First Chinese Office Action, 202010188972.3, dated Jun. 18, 2021 with Translation.

*Primary Examiner* — Thomas W Irvin
(74) *Attorney, Agent, or Firm* — Fishman Stewart PLLC

(57) ABSTRACT

A vibration absorber for absorbing and/or damping vibrations, such as of a vehicle part, may include at least one absorber mass having an opening, and at least two spring devices inserted into the opening. The spring devices may have at least one elastomeric spring element and a supporting body. The supporting body may accommodate the elastomeric spring elements. The supporting body may have an insertion section for inserting the supporting body and the elastomeric spring elements into the opening. The insertion section may be inclined relative to a longitudinal axis of the vibration absorber.

13 Claims, 3 Drawing Sheets

(56) References Cited

U.S. PATENT DOCUMENTS

| | | | | |
|---|---|---|---|---|
| 6,857,623 | B2* | 2/2005 | Kuwayama | F16F 7/108 |
| | | | | 267/141 |
| 6,893,010 | B2* | 5/2005 | Groth | F16F 1/3842 |
| | | | | 267/141.1 |
| 7,044,457 | B2* | 5/2006 | Bucksbee | F16F 1/3849 |
| | | | | 248/636 |
| 2005/0133325 | A1* | 6/2005 | Kuwayama | F16F 1/3814 |
| | | | | 188/379 |
| 2005/0206054 | A1 | 9/2005 | Nishi | |
| 2006/0157903 | A1* | 7/2006 | Hayashi | F16F 15/1442 |
| | | | | 267/293 |
| 2014/0196999 | A1 | 7/2014 | Mitsch et al. | |
| 2019/0186577 | A1* | 6/2019 | Back | F16F 7/108 |

FOREIGN PATENT DOCUMENTS

| | | |
|---|---|---|
| CN | 204282432 U | 4/2015 |
| CN | 204437172 U | 7/2015 |
| CN | 105003577 A | 10/2015 |
| CN | 205365619 U | 7/2016 |
| CN | 207583931 U | 7/2018 |
| DE | 69826221 T2 | 11/2005 |
| DE | 102005033528 B3 | 8/2006 |
| EP | 1286076 A1 | 2/2003 |

\* cited by examiner

VIBRATION ABSORBER

CROSS-REFERENCE TO RELATED APPLICATION

This application claims priority to German Patent Application No. 102019107885.7, filed Mar. 27, 2019, the contents of which are hereby incorporated by reference in its entirety.

TECHNICAL FIELD

The invention relates to a vibration absorber for absorbing and/or damping vibrations of a vehicle part, comprising at least one absorber mass having an opening and at least two spring devices which are inserted into the opening.

BACKGROUND

Vibration absorbers of the type mentioned above may be used to reduce vibrations transmitted from the engine to a part of the vehicle, such as a gearbox, while the vehicle is in motion or at a standstill, which may increase travelling comfort. Some vibration absorbers may have a spring device composed of elastomeric material, and a mass element, the mass element being coupled to the vehicle part to be damped in a manner so as to be capable of vibrating. When a vehicle part connected to the vibration absorber starts to vibrate, the absorber mass resonates with a 90° phase shift, wherein the vibrations are damped by the spring device.

The trend towards electric vehicles is placing increasing requirements on so-called "high-frequency absorbers", since noise and the resulting vibrations in this frequency range come to the fore due to the absence of dominant noise or vibrations of a combustion engine.

In addition to the requirements with regard to high frequencies, the three linear rigid body resonances should, at least in some circumstances, have the same frequency or a certain ratio to each other. Conventional vibration absorbers with radially or axially arranged spring devices can only be adjusted in a very limited frequency ratio, which is related to the physical properties of the elastomer with regard to tension-compression stiffness and shear stiffness.

There is a desire for solutions/options that minimize or eliminate one or more challenges or shortcomings of vibration absorbers. The foregoing discussion is intended only to illustrate examples of the present field and is not a disavowal of scope.

SUMMARY

Embodiments of the present disclosure may include a vibration absorber which has an improved adjustable frequency ratio in the high frequency range and is also cost-effective.

Advantageous embodiments of the vibration absorber are described.

With embodiments, a vibration absorber, in particular a modular vibration absorber, for absorbing and/or damping vibrations of a vehicle part, may comprise at least one absorber mass having an opening and/or at least two spring devices which are inserted into the opening. Each of the spring devices may have at least one elastomeric spring element and a supporting body. The supporting body may receive the spring element. The supporting body may have an insertion section for inserting the supporting body and the spring element into the opening, which may be inclined relative to a longitudinal axis of the vibration absorber.

In embodiments, the supporting bodies may have an insertion section that is inclined with respect to the longitudinal axis of the vibration absorber, so a frequency spread between radial and axial resonance frequency may be set so that the frequency ratio of the vibration absorber can be specifically adjusted in a high-frequency range.

In embodiments, the insertion section may be inclined at an angle to the longitudinal axis of the vibration absorber. The angle may also be referred to as the inclination angle. The angle, or inclination angle, is the angle that the inclined surface of the insertion section forms with the longitudinal axis. This angle may depend on the frequency to be adjusted. A radial and axial frequency spread may be adjusted via the angle. In embodiments, the angle may be greater than 0° and/or less than 90°. In embodiments, the spring element may be received by the supporting body in such a way that the spring element surrounds the supporting body, such as on the outer circumference. In embodiments, the supporting body may also be described as a fixing element, as it may fix the spring element to the absorber mass. In embodiments, the supporting body may fix the spring element to the absorber mass.

With embodiments, a supporting body may receive the spring element, which may allow for manufacturing the elastomeric spring element separately. For example, an elastomeric shaped part may be used as a spring element which can be adjusted specifically to a desired frequency ratio. Additionally or alternatively, the manufacturing costs of the vibration damper may be reduced, such as because preheating of the damper mass, which may be necessary for vulcanizing an elastomeric spring device, may no longer be required. Additionally or alternatively, the elastomer spring elements may be manufactured with a high tool cavity.

With embodiments, a vibration absorber may be created in the form of a modular kit. Spring elements with different properties, such as different Shore hardnesses, and supporting bodies with different inclination angles and mass-external geometries may be used.

In embodiments, the opening may include a through hole that may extend from a first end of the absorber mass to a second end of the absorber mass. In embodiments, the absorber mass may have two openings and a spring device may be inserted into one or both openings.

In embodiments, a first spring device may be inserted into the opening at a first end of the absorber mass and/or a second spring device may be inserted into the opening at a second end of the absorber mass. For example, the spring devices may be inserted opposite each other in the opening. For this purpose, for example, the opening at both ends of the absorber mass may include an insertion bevel that may correspond to inclined insertion sections and/or a contour of the spring elements.

In embodiments, the supporting bodies may, for example and without limitation, be made of metal and/or plastic. Some or all of the supporting bodies may have a hole through which a fastening element can be passed in order to connect the vibration absorber to a vehicle part. The fastening element may extend through the opening and the holes for fastening to a vehicle part.

In embodiments, the absorber mass, for example and without limitation, may be made of metal and/or may be cylindrical.

In embodiments, a vibration absorber may be used, for example, for absorbing and/or damping a vehicle part, such as a gearbox, tailgate or chassis.

In embodiments, the opening may have insertion bevels that may be formed to correspond to inclined insertion sections and/or to a contour of the spring elements, which may facilitate insertion of the supporting bodies together with the spring elements. Additionally or alternatively, the insertion bevels may facilitate adjusting the frequency spread between radial and axial resonance frequency. In embodiments, the opening may widen conically towards both end faces of the absorber mass. For example, the insertion bevels may be inclined in relation to the longitudinal axis of the vibration absorber. Thus, the insertion bevels form an angle with the longitudinal axis of the vibration absorber. The angle of the insertion bevels may also be referred to as the inclination angle. In embodiments, the angle, for example, may be greater than 0° and/or less than 90°. In embodiments, the angle of the insertion bevels may correspond to the angles of the insertion sections. Additionally or alternatively, the angles of the insertion bevels and the angles of the insertion sections may be different.

In embodiments, the spring elements may be connected to the supporting bodies and/or the absorber mass in a positive fit, non-positive-fit, and/or substance-to-substance bond, which may allow a simple and cost-effective attachment of the spring elements to the supporting bodies and/or the absorber mass. The spring elements may be placed or slid onto the supporting body with a positive and/or non-positive fit. The spring elements may be connected to the supporting bodies in such a way that the spring elements surround the outer circumference of the supporting bodies. The elastomeric spring elements may be connected to the supporting bodies and/or the absorber mass in a substance-to-substance bond. For this purpose, for example, the supporting bodies and/or the absorber mass may be placed in an injection mold and/or the spring elements may be injected onto the supporting bodies and/or the absorber mass.

In embodiments, the spring elements may be funnel-shaped, which may allow the frequency spread between the radial and axial resonant frequency of the spring elements to be specifically adjusted. An inclination angle of the spring elements may correspond to the inclination angle of the insertion sections and/or the inclination angle of the insertion bevels of the opening. In embodiments, the spring elements may have a funnel portion corresponding to the insertion bevels and the insertion sections, and a sleeve section corresponding to a cylindrical section of the supporting bodies. Thus, an inner circumferential contour of the spring elements may correspond to an outer circumferential contour of the supporting bodies so that the spring elements enclose the outer circumference of the supporting bodies.

In embodiments, some or all of the supporting bodies may have a cylindrical portion adjacent to the insertion section, the outer diameter of which may be larger than an inner diameter of the opening. The cylindrical section may act as a loss prevention device that may prevent and/or restrict the absorber mass from falling off in the event of failure of rubber or bond.

In embodiments, the two spring devices may be connected to each other by a fastening sleeve extending through the opening. The fastening sleeve may fasten the two spring devices, which may be inserted at the end of the opening, to the absorber mass. In order to fasten the spring devices, the fastening sleeve may extend through the opening. In embodiments, an outer diameter of the fastening sleeve may be smaller than an inner diameter of the opening. This may keep the fastening sleeve at a distance from the absorber mass, which may allow the absorber mass to move relative to the fastening sleeve, such as to absorb and/or to damp vibrations. The vibration absorber may be fastened to a vehicle part via the fastening sleeve. For this purpose, for example, the fastening sleeve may have a passage through which a fixing element may extend. In embodiments, the sleeve may be made of metal and/or plastic, for example.

In embodiments, a fastening sleeve may be connected to the supporting bodies with a positive and/or non-positive fit. This may provide a simple and cost-effective way of fastening the supporting bodies via the fastening sleeve. Some or all of the supporting bodies may have a hole into which the fastening sleeve may be inserted with a positive and/or non-positive fit, with the fastening sleeve extending through the opening.

In embodiments, a non-positive fit between the spring devices and the fastening sleeve may be achieved during the fastening of the vibration absorber to an adjacent vehicle part by means of a positive fit. An interference fit between the fastening sleeve and the supporting bodies may be secured by a positive fit between a fastening element and a contact surface of a motor vehicle component, such as in the final assembly. Securing by a positive fit may, for example, allow for the use of plastic for the supporting bodies.

In embodiments, the spring elements of the spring devices may be connected to each other. In particular, the two spring elements may be made of the same material and/or may be designed in one piece. This may allow the spring elements to be manufactured in a vulcanization process. For example, the spring elements may be manufactured in the form of an elastomeric hose or a rubber plate.

In embodiments, the insertion sections of the supporting bodies may be inclined at different angles in relation to a longitudinal axis of the vibration absorber. Thus, the supporting bodies may have different inclination angles. As a result, the adjusting ratio of the two spring devices and thus, the frequency spread between radial and axial resonance frequency, may be different. With such a configuration, for example, asymmetric spreading of masses can be balanced.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

In the following, exemplary embodiments of vibration absorbers as well as further features and advantages are explained in more detail by means of design examples, which are shown schematically in the figures.

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
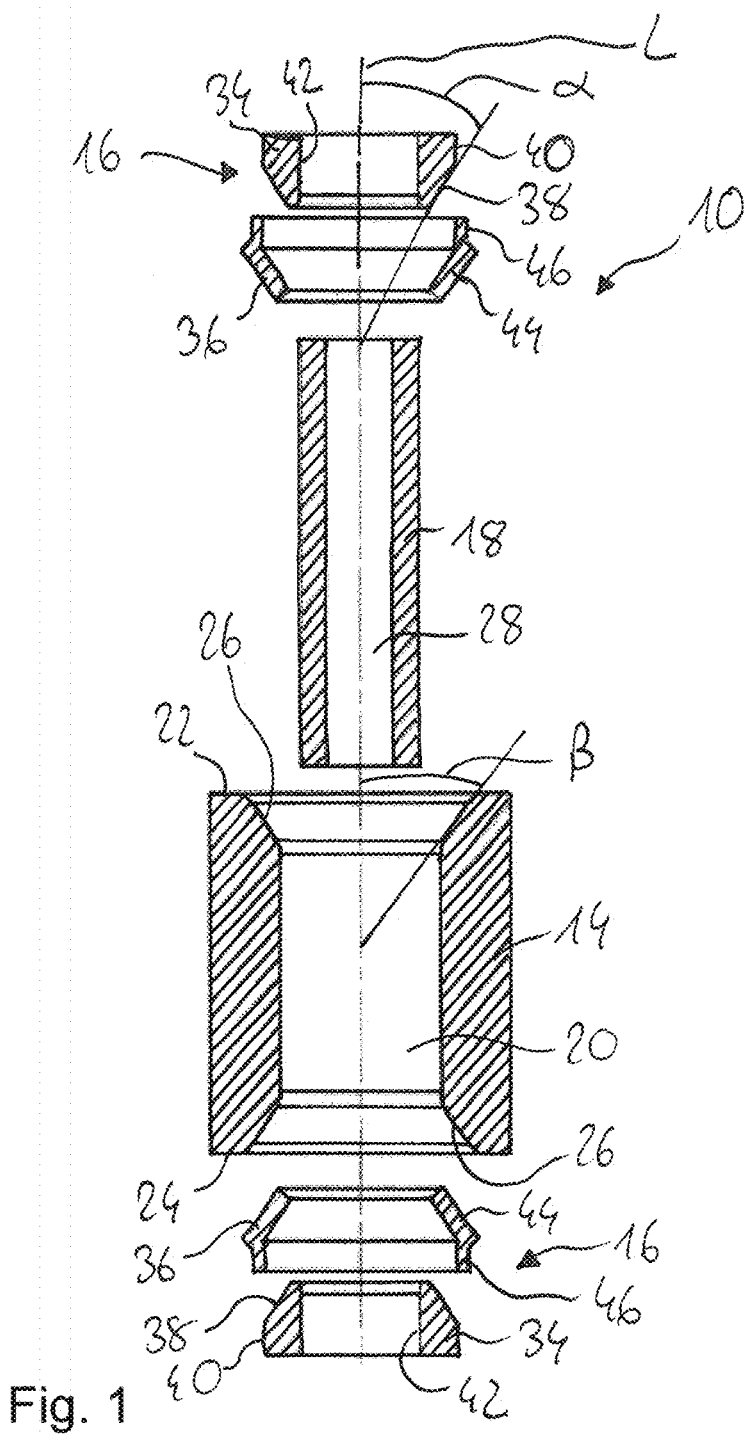
FIG. 1 is a cross-sectional view of a vibration absorber according to an embodiment in an unassembled condition.
Figure 3:
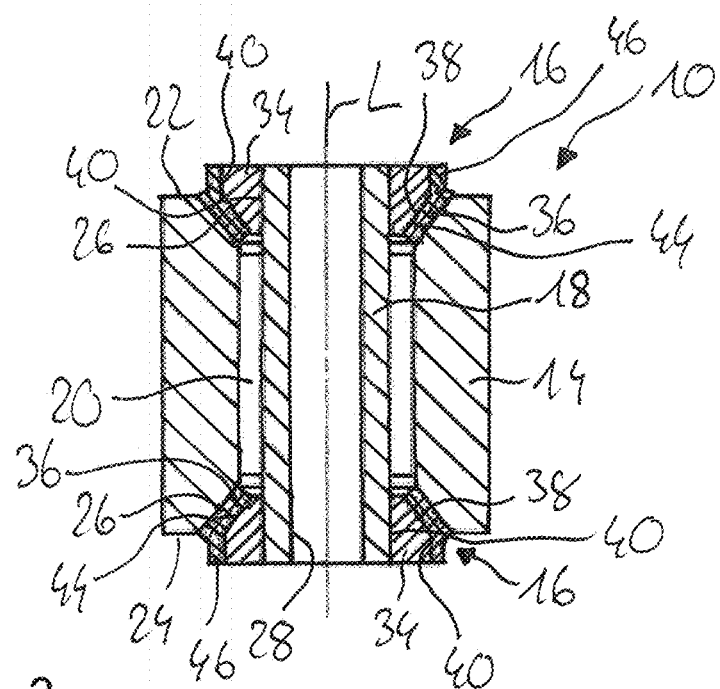
FIG. 3 is a cross-sectional view of the embodiment of a vibration damper shown in FIG. 1 in a mounted condition.
Figure 4:
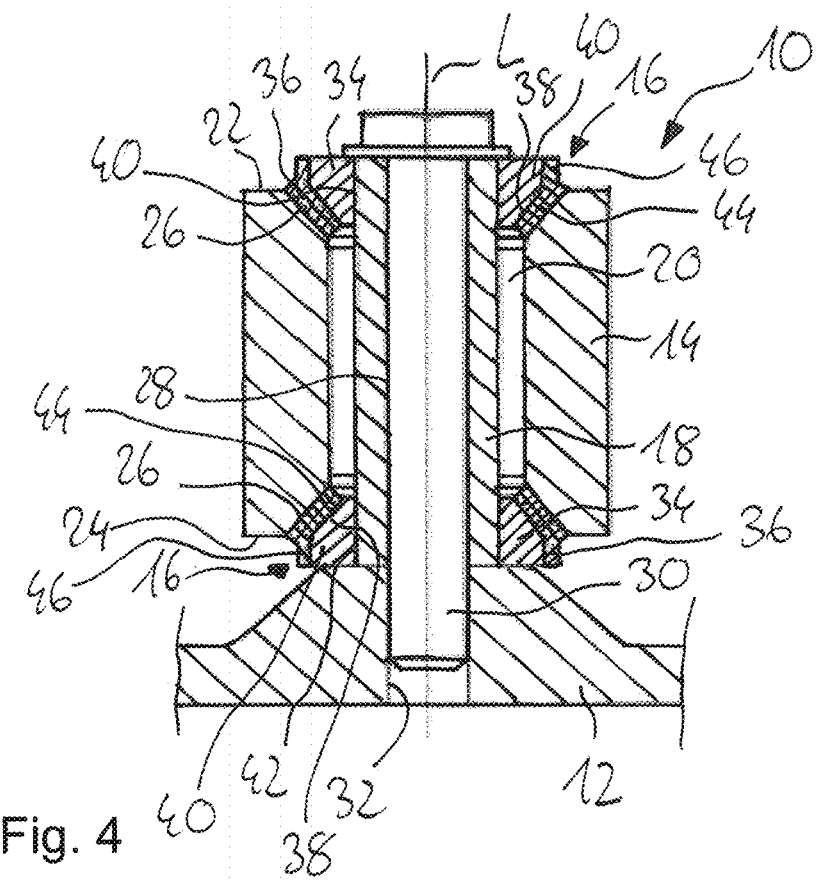
FIG. 4 is a cross-sectional view of the embodiment of a vibration damper shown in FIG. 3, which is fastened to a vehicle part.

FIGS. 1, 3 and 4 show a vibration absorber 10 according to a first embodiment, which may be used to absorb and/or damp vibrations, such as vibrations of a vehicle part 12.

With embodiments, a vibration absorber 10 may have an absorber mass 14, a plurality (e.g., two) spring devices 16, and/or a fastening sleeve 18. The fastening sleeve 18 may be configured for fixing the two spring devices 16 to the absorber mass and/or to the vehicle part 12.

In embodiments, the absorber mass 14, for example and without limitation, may be made of metal and may have a substantially cylindrical shape. An opening 20 may be introduced in the absorber mass. The opening 20 may extend from a first end 22 of the absorber mass 14 to a second end 24 of the absorber mass 14. The opening 20 may be provided with an insertion bevel 26 at one or both ends 22, 24. The insertion bevels 26 may be inclined relative to a longitudinal axis L of the vibration absorber 10. The insertion bevels 26 may form an angle $\beta$, which may be referred to as the inclination angle, with the longitudinal axis L. The angle $\beta$ may, for example and without limitation, be greater than 0° and/or less than 90°.

With embodiments, the fastening sleeve 18, for example, may include a metal sleeve that extends through the opening 20. In embodiments, such as generally illustrated in FIGS. 3 and 4, an outer diameter of the fastening sleeve 18 may be smaller than an inner diameter of the opening 20 so that the absorber mass 14 can move relative to the fastening sleeve 18, such as to absorb and/or damp vibrations, such as vibrations of a vehicle part 12.

In embodiments, a fastening sleeve 18 may be utilized to fasten the vibration absorber 10 to the vehicle part 12. For this purpose, for example, the fastening sleeve 18 may have a passage 28 through which the fastening element 30 (see, e.g., FIG. 4) may extend. The fastening element 30 may, for example, be designed as a hexagon head screwed into a threaded hole 32 that may be provided in the vehicle part 12.

Figure 2:
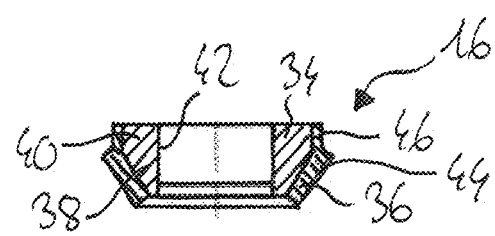
FIG. 2 is a cross-sectional view of an embodiment of a spring device.

With embodiments, such as generally illustrated in FIG. 2, some or each of the spring devices 16 may have a supporting body 34 and an elastomeric spring element 36 that may be received by the supporting body 34, such as by connecting the spring element 36 to the supporting body 34 in a positive fit, non-positive-fit, and/or substance-to-substance bond.

In embodiments, a supporting body 34 may, for example and without limitation, include metal and/or plastic. The supporting body 34 may have an insertion section 38 for inserting the supporting body 34 and the spring element 36 into the opening 20. With embodiments, such as generally illustrated in FIG. 2, the insertion section 38 may be inclined relative to the longitudinal axis L of the vibration absorber 10. The insertion section 38 may form an angle $\alpha$, which may also be referred to as the inclination angle, with the longitudinal axis L. The angle $\alpha$ may, for example and without limitation, be greater than 0° and/or less than 90°. In embodiments, such as generally illustrated in FIGS. 3 and 4, the two angles $\alpha$ and $\beta$ may be of substantially equal size.

With embodiments, adjacent to the insertion section 38, a cylindrical section 40 may be arranged. The outer diameter of the cylindrical section may, for example, be larger than an inner diameter of the opening 20. Thus, the supporting body 34 (e.g., cylindrical section 40) may form a loss prevention that may prevent and/or restrict the absorber mass 14 from falling off.

In embodiments, for fastening the supporting body 34 to the fastening sleeve 18, for example, the supporting body may have a bore hole 42 into which the fastening sleeve may be inserted, such as with a positive and/or non-positive fit.

In embodiments, the spring element 36 may be designed as a separately produced elastomeric shaped part and may be generally funnel-shaped. With embodiments, such as generally illustrated in FIGS. 1 to 4, the spring element 36 may have a funnel portion 44 corresponding to the insertion bevel 26 and the insertion section 38, and/or a sleeve section 46 corresponding to the cylindrical section 40. For example, an inner circumferential contour of the spring element 36 may correspond to an outer circumferential contour of the supporting body 34, so that the spring element 36 encloses the outer circumference of the supporting body 34 (see, e.g., FIG. 2).

In embodiments, a vibration absorber 10 may be mounted with or on a vehicle part 12. For example, the spring elements 36 may first be placed, in particular pressed, onto the supporting bodies 34 to form two spring devices 16. Then, the fastening sleeve 18 may be inserted into the opening 20. Subsequently, the spring devices 16 may be slid onto the fastening sleeve 18. Finally, the fastening element 30 may be inserted into the passage 28 and/or screwed into a threaded bore hole 32 of the vehicle part 12. A non-positive fit between the fastening sleeve 18 and the supporting bodies 34 may, for example and without limitation, only be secured by a positive fit between a head of the fastening element 30 and a contact surface of the vehicle part 12 in the final assembly.

With embodiments, the supporting body 34 may have an insertion section 38 that may be inclined relative to the longitudinal axis L of the vibration absorber 10, which may allow for a frequency spread between radial and axial resonance frequency to be adjusted, for example, so that the frequency ratio of the vibration absorber 10 can be specifically adjusted in a high-frequency range. Additionally or alternatively, the spring element 36 may be manufactured separately as a low-cost elastomeric shaped part with a high tool expertise.

In the following a further exemplary embodiment of a vibration absorber 10 is described, with the same reference signs being used for similar or functionally similar parts.

Figure 5:
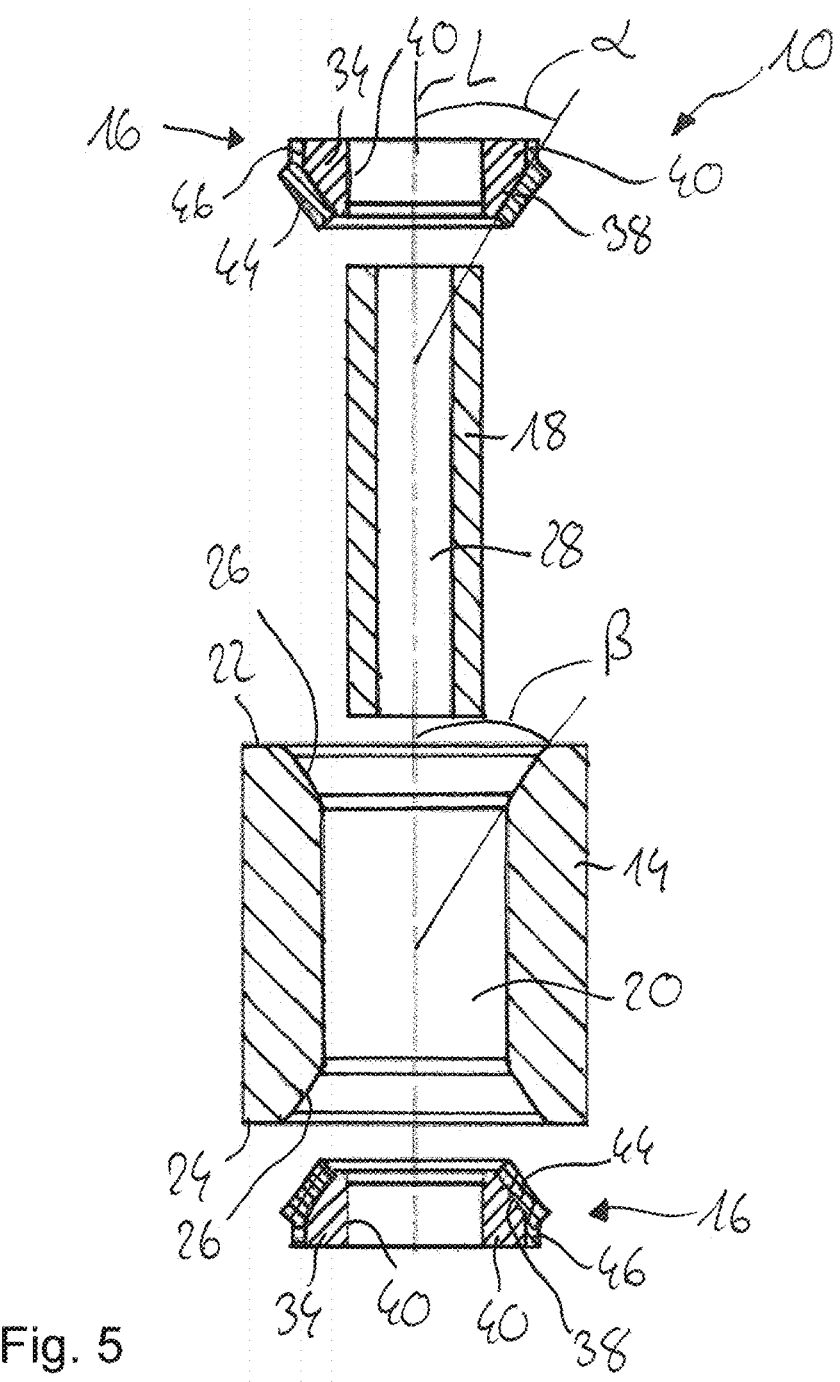
FIG. 5 is a cross-sectional view of a vibration absorber according to an embodiment in unassembled condition.

FIG. 5 generally illustrates a second embodiment of a vibration absorber 10, which differs from the first embodiment in that the spring elements 36 may be connected to the supporting bodies 34 in a substance-to-substance bond. For example, the supporting bodies 34 may placed in an injection mold, and the spring elements 36 may be injection-molded onto/with the supporting bodies 34.

In embodiments, a vibration absorber 10 may include inclined insertion sections 38 of the supporting bodies 34, which may allow for a frequency spread between radial and axial resonance frequency to be adjusted, while the spring elements 36 may be produced as separate and cost-effective elastomer moldings. Additionally or alternatively, a vibration absorber 10 may be created/provided in the form of a modular kit, as spring elements 36 with different properties, such as different Shore hardnesses, and support bodies 34 with different inclination angles $\alpha$, may be used.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A vibration absorber for absorbing and/or damping vibrations of a vehicle part, the vibration absorber comprising:
at least one absorber mass having an opening; and
at least two spring devices inserted into the opening,
wherein each of the spring devices has at least one elastomeric spring element and a supporting body;
wherein the supporting bodies receive the elastomeric spring elements;
wherein the supporting bodies have respective insertion sections for inserting the supporting bodies and the elastomeric spring elements into the opening;
wherein the insertion sections are inclined relative to a longitudinal axis of the vibration absorber;
wherein the spring devices are connected to each other via a fastening sleeve extending through the opening; and
wherein the fastening sleeve is connected to the supporting bodies in a non-positive fit.

2. The vibration absorber of claim 1, wherein the opening has insertion bevels that correspond to the insertion sections and/or to a contour of the elastomeric spring elements.

3. The vibration absorber of claim 2, wherein the elastomeric spring elements are connected to the supporting bodies and/or the absorber mass via a positive fit, a non-positive-fit, and/or substance-to-substance bond.

4. The vibration absorber of claim 1, wherein the elastomeric spring elements are connected to the supporting bodies and/or the absorber mass via a positive fit, a non-positive-fit, and/or substance-to-substance bond.

5. The vibration absorber of claim 1, wherein the elastomeric spring elements are funnel-shaped.

6. The vibration absorber of claim 1, wherein the supporting bodies have respective cylindrical portions adjacent to the insertion sections; and
outer diameters of the cylindrical portions are larger than an inner diameter of the opening.

7. The vibration absorber of claim 1, wherein a non-positive fit between the spring devices and the fastening sleeve is provided by a positive fit during fastening of the vibration absorber to an adjacent vehicle part.

8. The vibration absorber of claim 7, wherein the elastomeric spring elements of the spring devices are connected to each other.

9. The vibration absorber of claim 7, wherein the insertion sections of the supporting bodies are inclined at different angles relative to the longitudinal axis of the vibration absorber.

10. The vibration absorber of claim 1, wherein a non-positive fit between the spring devices and the fastening sleeve is provided by a positive fit during fastening of the vibration absorber to an adjacent vehicle part.

11. The vibration absorber of claim 10, wherein the elastomeric spring elements of the spring devices are connected to each other.

12. The vibration absorber of claim 1, wherein the insertion portions of the supporting bodies are inclined at different angles relative to the longitudinal axis of the vibration absorber.

13. The vibration absorber of claim 1, wherein the elastomeric spring elements of the spring devices are connected to each other.

* * * * *